(12) United States Patent
Kuzmin et al.

(10) Patent No.: US 8,030,933 B2
(45) Date of Patent: Oct. 4, 2011

(54) DOUBLE-SUSPENSION RECEIVER COIL SYSTEM AND APPARATUS

(75) Inventors: Petr Valentinovich Kuzmin, Aurora (CA); Edward Beverly Morrison, Newmarket (CA)

(73) Assignee: Geotech Airborne Limited, St. Michael (BB)

( * ) Notice: Subject to any disclaimer, the term of this patent is extended or adjusted under 35 U.S.C. 154(b) by 507 days.

(21) Appl. No.: 12/118,194

(22) Filed: May 9, 2008

(65) Prior Publication Data

US 2009/0278540 A1    Nov. 12, 2009

(51) Int. Cl.
*G01V 3/16* (2006.01)
*G01V 3/165* (2006.01)
*H01Q 1/30* (2006.01)

(52) U.S. Cl. ........................ 324/330; 343/707

(58) Field of Classification Search .................. 324/330, 324/331, 323, 326, 329, 334, 336, 344; 343/707, 343/705, 708
See application file for complete search history.

(56) References Cited

U.S. PATENT DOCUMENTS

| | | | | |
|---|---|---|---|---|
| 3,588,962 | A * | 6/1971 | Feldberg | 24/16 PB |
| 3,686,731 | A * | 8/1972 | Koori et al. | 492/56 |
| 4,641,100 | A | 2/1987 | Dzwinel | |
| 5,530,358 | A | 6/1996 | Wisler et al. | |
| 6,244,534 | B1 | 6/2001 | Klinkert | |
| 6,876,202 | B2 | 4/2005 | Morrison et al. | |
| 2003/0169045 | A1 | 9/2003 | Whitton | |
| 2005/0001622 | A1 * | 1/2005 | Morrison et al. | 324/330 |

FOREIGN PATENT DOCUMENTS

| | | |
|---|---|---|
| CA | 2187952 | 4/1998 |
| CA | 2450155 | 5/2004 |

OTHER PUBLICATIONS

Ward, AFMAG—Airborne and Ground, Geophysics, vol. XXIX, No. 4 (1959), pp. 761-789.*
International Search Report and Written Opinion; Aug. 6, 2009.
"Aerotem: System Characteristics and Field Results" Paper presented at a Special Session on "New EM Methods" at the 2000 Annual Meeting of the Society of Exploration Geophysicists, Aug. 6-11, 2000 in Calgary, Alta.; Boyko, W. (1), Paterson, N. R.(2) and Kwan, K.(3).
"Mineral Exploration With the Aero TEM System" S.J. Balch, W.P. Boyko, G. Black, and R.N.Pedersen, AeroQuest Limited.

(Continued)

*Primary Examiner* — Kenneth J Whittington
(74) *Attorney, Agent, or Firm* — Novak Druce + Quigg LLP

(57) ABSTRACT

The present invention is a double-suspension receiver coil apparatus and system for conducting electromagnetic surveys including, both ground-based and airborne measurements. The present invention includes at least one receiver coil suspended by way of first suspension members within an inner frame and said inner frame being suspended by second suspension members within an inner ring which is further enclosed within an outer frame. The double-suspension receiver coil apparatus functions so as to maintain the receiver coil position while minimizing vibrations in order to achieve a high signal-to-noise ratio and enable accurate measurements. The receiver coil may be in an airborne system in a near-horizontal position or in a ground system in a vertical position.

40 Claims, 10 Drawing Sheets

OTHER PUBLICATIONS

"Aero TEM Characteristics and Field Results" W. Boyko, AeroQuest Limited, Mississauga, Ontario, Canada; N. R. Paterson and K. Kwan, Paterson, Grant, and Watson Limited, Toronto, Ontario, Canada.

"Normandy Heli-Borne Time Domain EM System" Graham Boyd; Normandy Exploration: Australia.

"Airborne EM Applied to Sulphide Nickel—Examples and Analysis" Peter Wolfgram and Howard Golden; Keyword Airborne electromagnetic, Nickel sulphide.

"Newtem—A Novel Time-Domain Helicopter Electromagnetic System for Resistivity Mapping" Perry Eaton, Bob Anderson, Bruno Nilsson, Eric Lauritsen, Steve Queen, Colin Barnett; Newmont Mining Corporation, Englewood, USA.

"60 Years of Airborne EM—Focus on the Last Decade" David Fountain, formaly Fugro Airborne Surveys, Ottawa, Canada; AEM2008-5th International Conference on Airborne Electromagnetics; Haikko Manor, Finland, May 28-30, 2008.

* cited by examiner

DOUBLE-SUSPENSION RECEIVER COIL SYSTEM AND APPARATUS

FIELD OF INVENTION

This invention relates in general to the field of geological mapping. This invention further relates to a double-suspension receiver coil system and apparatus for conducting electromagnetic surveys including both ground-based and airborne measurements.

BACKGROUND OF THE INVENTION

Geophysical electromagnetic ("EM") techniques can be effective in determining the electrical conductivity of soils, rocks and other conductive material at depths from the surface of up to about three kilometers. Conductivity distribution at depths is of great interest to those involved in mapping base metals and uranium deposits, aquifers and other geological formations.

Geophysical EM methods can involve measurements of time-varying magnetic fields near the earth's surface. These may be produced by way of a primary magnetic field and modeling of the ground conductivity distributions. A magnetic field may be generated either by a periodic current applied to a transmitter, or by naturally occurring electromagnetic fields originating mainly from lightning in the earth's atmosphere. EM fields can have a characteristic ground penetration depth proportional to the inverse of the square-root of both ground conductivity and frequency.

Traditionally the magnetic field signal can be measured using either a receiver coil system (which can measure up to three orthogonal components of the magnetic field time-derivative dB/dt), or a magnetometer (which measures the magnetic field B). The received analog signal may then be amplified, filtered, and digitized by a high-resolution high-speed analog-to-digital converter (ADC), and the data can be stored along with the positioning information obtained from a Global Positioning System (GPS). Data post-processing may involve electrical and physical modeling of the ground to generate the geophysical conductivity contour maps.

Geophysical surveys may typically require high signal-to-noise ratio (SNR), high conductivity discrimination, and high spatial resolution, both laterally and in depth. The preferred EM method may differ depending on ground conductivity and the desired probing depth.

EM systems may encompass both ground-based and airborne measurements using airplanes and helicopters. Airborne methods may be preferred for large area surveys and can be used for exploration of conductive ore bodies buried in resistive bedrock, geological mapping, hydrogeology, and environmental monitoring.

For airborne electromagnetic ("AEM") systems, the data may be acquired while the airplane or helicopter flies at a nearly constant speed (up to 75 m/s or 30 m/s, respectively) along nearly-parallel and close to equally-spaced lines (50 m to 200 m) at an approximately constant height above ground (about 120 m or 30 m, respectively). Measurements can be taken at regular intervals, typically in the range 1 m up to 100 m.

Fixed-wing airplane AEM systems may carry large transmitter coils and can be capable of deeper investigation of discrete conductors, such as base metals and uranium deposits, while helicopter frequency-domain electromagnetic ("HFEM") systems can be effective in near-surface mapping with high near-surface resolution, although limited depth penetration. Over the last decade, the key driver in geophysical surveying has been to develop helicopter-mounted time-domain electromagnetic ("HTEM") systems.

EM measurements can be recorded either in the frequency domain or time domain. In frequency-domain electromagnetic ("FDEM") measurements, the transmitter coil continuously may transmit an electromagnetic signal at fixed multiple frequencies, while the receiver coil measures the signal continuously over time. The measured quantities may be either signal amplitude and phase as a function of frequency, or equivalently, the in-phase and in-quadrature amplitudes as a function of frequency. In these measurements, the signal sensitivity can be reduced with increasing conductivity, and thereby may reduce the conductivity contrast mapping.

In time-domain electromagnetic ("TDEM") measurements, a pulse of current may be applied to the transmitter coil during an on-period and switched off during the off-period, typically at a repetition rate equal to an odd multiple of half of the local power line frequency (typically 5 GHz or 60 Hz). The signal may be measured at the receiver as a function of time. The signal amplitude decay during the off-period, combined with modeling of the conductivity and geometry of geological bodies in the ground, can be utilized to yield the conductivity contour maps.

In Audio Frequency Magnetic ("AFMAG") measurements, naturally occurring EM fields produced by global lightning discharges may be used as the excitation source. These EM fields propagate around the earth as plane waves guided by the ionosphere and earth's surface. Lightning activity occurring more than 1000 km away from the measurement point can produce signals with a nearly flat spectral density between 8 Hz and 500 Hz, varying with geographical location, time of the day, seasons and weather conditions. Lightning occurring within about 1000 km from the measurement point can produce pulses with duration of a few milliseconds with spectral density in the range from 2 kHz to 20 kHz.

In AFMAG, the vertical component of the signal may be measured by the airborne receiver coil in the frequency range 25 Hz to 2 kHz with data acquisition at 6.25 kHz with 24 bits resolution. The measured signal may then be selected by frequency bands linearly spaced in the log scale spaced by approximately 1.5 dB, and then processed to produce conductivity contour maps. AFMAG may also uses measurements of the horizontal magnetic field in real time in order to normalize the measurements done in the aerial survey as the source intensity is constantly varying.

One possible AFMAG setup is to use two orthogonal coils at the ground base station to yield the horizontal component of the magnetic field, and one flying coil to measure the vertical component of the magnetic field. A third vertical coil can also be used at the ground base station to improve the measurement of the reference signal. The aerial measurements can be made typically at a distance less than 50 km from the ground base station.

Alternative setups can use three-component measurements at the ground station and/or three component measurements obtained in flight. Multiple base stations can also be used to locate the EM field source and improve the SNR of the measurements.

Besides the HTEM system provided by Geotech, named VTEM (Versatile Time-Domain Electromagnetic), over the last few years other systems became operational. These include: AeroTEM by Aeroquest Ltd., THEM by THEM Geophysics Inc., HoisTEM by Normandy Exploration Ltd., NewTEM by Newmont Mining Corp., ExploHEM by Anglo American, SkyTEM by SkyTEM ApS., and HeliGEOTEM by Fulgro Airborne Survey.

Whenever measurement of the signal proportional to dB/dt is required, a coil may be the best choice as sensor because it measures dB/dt directly. The voltage induced in the receiver coil by a magnetic field B is given by N.A.dB/dt, where the coil sensitivity N.A is the product of the coil number of turns N and the coil area A, and dB/dt is the time-derivative of the magnetic field. The inductance of a coil is proportional to $N^2.D$, where N is the number of turns and D is the effective diameter of the coil.

For the receiver coil system of both the TDEM and AFMAG systems, the dynamic range required for the pre-amplifier and the ADC may typically be in the range of 120 dB, dictated by the ratio between the maximum signal amplitude and the input noise of the pre-amplifier.

In TDEM, to increase the dynamic range, one can place the receiver coil several meters above the transmitter coil to reduce the signal produced by the transmitter coil at the receiver. Alternatively, one can either use an auto-scaling pre-amplifier or switch the pre-amplifier gain between low-gain during the on-period and high-gain during the off-period. Use of adjustable gain amplifiers can make data acquisition more complex, but may have the advantage of keeping the transmitter and receiver coils concentric, thereby minimizing anomalous mapping profiles. For a 40 dB adjustable gain pre-amplifier, a 16-bit ADC is sufficient to digitize the signal. If a 24-bit ADC is used, the system may use a fixed gain pre-amplifier.

Sources of electrical noise at the receiver coil can include the spurious signals produced by both the helicopter and other metallic parts of the system, lightning activity in the atmosphere, local AC power line interference, VLF radio waves in the 15-25 kHz frequency range, and thermal noise from the coil and the electronics. However, the main source of noise at the airborne receiver coil can be the microphonic noise produced by the motion of the coil in the magnetic field of the earth. The motion can be produced by wind buffeting the coil, vibration from the aircraft, and rubbing of the coil against the coil suspension system.

In an attempt to increase SNR, U.S. Pat. No. 6,876,202 titled "System, Method and Computer Product Geological Surveying Utilizing Natural Electromagnetic Fields", inventors Edward Beverly Morrison and Petr Valentinovich Kuzmin, granted 5 Apr. 2005 discloses a receiver coil and suspension means that facilitates a reduction of microphonic noise produced by mechanical vibrations of the receiver coil in the magnetic field of the earth. The method applied by U.S. Pat. No. 6,876,202 is to surround the coil with an acoustic noise absorber. It also discloses a means of reducing noise through permitting distance between the sensors and the aircraft. However, the Morrison invention does not introduce with suspension mechanisms to mitigate these noises.

Furthermore U.S. Pat. No. 7,157,914 discloses a double-structure receiver suspension apparatus. This prior art invention is aimed at reducing vibration and microphonic noise, however the elastic suspension means disclosed is prone to noise created by the rubbing of elements of the receiver coil. There is need for a double-structure receiver suspension apparatus that further reduces such noise. In addition, there is a need for a double structure receiver suspension apparatus that ameliorates the maintenance of the receiver coil within the receiver frame in a generally horizontal position during flight.

Increasing signal-to-noise ratio (SNR) at the receiver coil may not be straightforward due to many factors affecting the measurement. In order to minimize the noise produced by various sources in the frequency range of interest, one may need to reduce the movement of the receiver coil relative to the magnetic field of the earth, prevent external mechanical noises from reaching the receiver coil, and minimize the mechanical noises produced by the receiver coil suspension system.

An advantage of the double-suspension receiver coil of the present invention is that it can be used to overcome the SNR problems of the prior art.

SUMMARY OF THE INVENTION

In one aspect, the present disclosure relates to a double-suspension receiver coil apparatus comprising: a receiver coil; one or more first suspension members; one or more second suspension members; an inner frame; and an outer frame; wherein the receiver coil is suspended by the first suspension members that connect the receiver coil and the inner frame so as to be positioned at or near the centre of the inner frame and the inner frame is suspended by second suspension members that connect the inner frame and outer frame so as to be positioned at or near the centre of the outer frame.

In another aspect, the present disclosure relates to a double-suspension receiver coil airborne system comprising: a tow assembly for connection to an aircraft, the tow assembly including: a transmitter section; a transmitter frame; and a receiver frame including: an inner frame having a receiver coil therein suspended by one or more first suspension members so as to be positioned at or near the centre of the inner frame; and an outer frame having the inner frame suspended by one or more second suspension members so as to be positioned at or near the centre of the outer frame.

In yet another aspect, the present disclosure relates to a double-suspension receiver coil ground-station system comprising: a receiver frame including: an inner frame having multiple receiver coils therein suspended by one or more first suspension members so as to be positioned at or near the centre of the inner frame; and an outer frame having the inner frame suspended by one or more second suspension members so as to be positioned at or near the centre of the outer frame; a mounting support whereby the receiver frame is positioned so that the receiver coils are mounted vertically perpendicular to each other; whereby the receiver coils function to measure a magnetic field in the horizontal plane.

In a further aspect, the present disclosure relates to a method of assembling a double-suspension receiver coil system comprising the steps of: suspending a receiver coil within an inner frame the inner frame suspension means including: one or more first suspension members wherein the first suspension members connect to the inner frame and the receiver coil and whereby said connection the receiver coil is suspended close to the centre of the inner frame; suspending the inner frame within an outer frame the outer frame suspension means including: one or more inner rings; and one or more second suspension members; wherein the inner rings are secured to the inside wall of the outer frame and the second suspension members connect to the inner rings and the inner frame and whereby said connection the inner frame is suspended close to the centre of the outer frame.

In another aspect, the present disclosure relates to a method of repairing a double-suspension receiver coil system comprising the steps of: opening a double-suspension receiver coil system including: an inner frame having an open top-end and a receiver coil therein suspended by one or more first suspension members so as to be positioned at or near the centre of the inner frame; and an outer frame formed of first and second sections releaseably attached, having the inner frame suspended by one or more second suspension members so as to be positioned at or near the centre of the outer frame; wherein the means whereby the first and second sections of the outer frame are releaseably attached is released to separate the first and second sections allowing access to the second suspension members and inner frame; removing any broken second suspension members or alternatively any broken first suspension members accessible through the open top end of the inner frame; replacing any broken first or second suspension members; and re-attaching the first and second outer frame members in a releaseably attached manner.

In yet another aspect, the present disclosure relates to a double-suspension receiver coil airborne system comprising: a tow assembly for connection to an aircraft, the tow assembly including; a receiver frame including: an inner frame having a receiver coil therein suspended by one or more first suspension members so as to be positioned at or near the centre of the inner frame; and an outer frame having the inner frame suspended by one or more second suspension members so as to be positioned at or near the centre of the outer frame.

In another aspect, the present invention relates to a double-suspension receiver coil apparatus comprising: a receiver coil; one or more first suspension members; one or more second suspension members; an inner frame; and an outer frame; wherein the receiver coil is suspended by the one or more first suspension members that connect the receiver coil and the inner frame so as to be positioned at or near the centre of the inner frame and the inner frame is suspended by the one or more second suspension members that connect the inner frame and outer frame so as to be positioned at or near the centre of the outer frame; and wherein the one or more first suspension members and one or more second suspension members are coated with silicone or a similar substance where said suspension members connect to the inner frame, outer frame or receiver coil to reduce the noise produced by rubbing.

Figure 1:
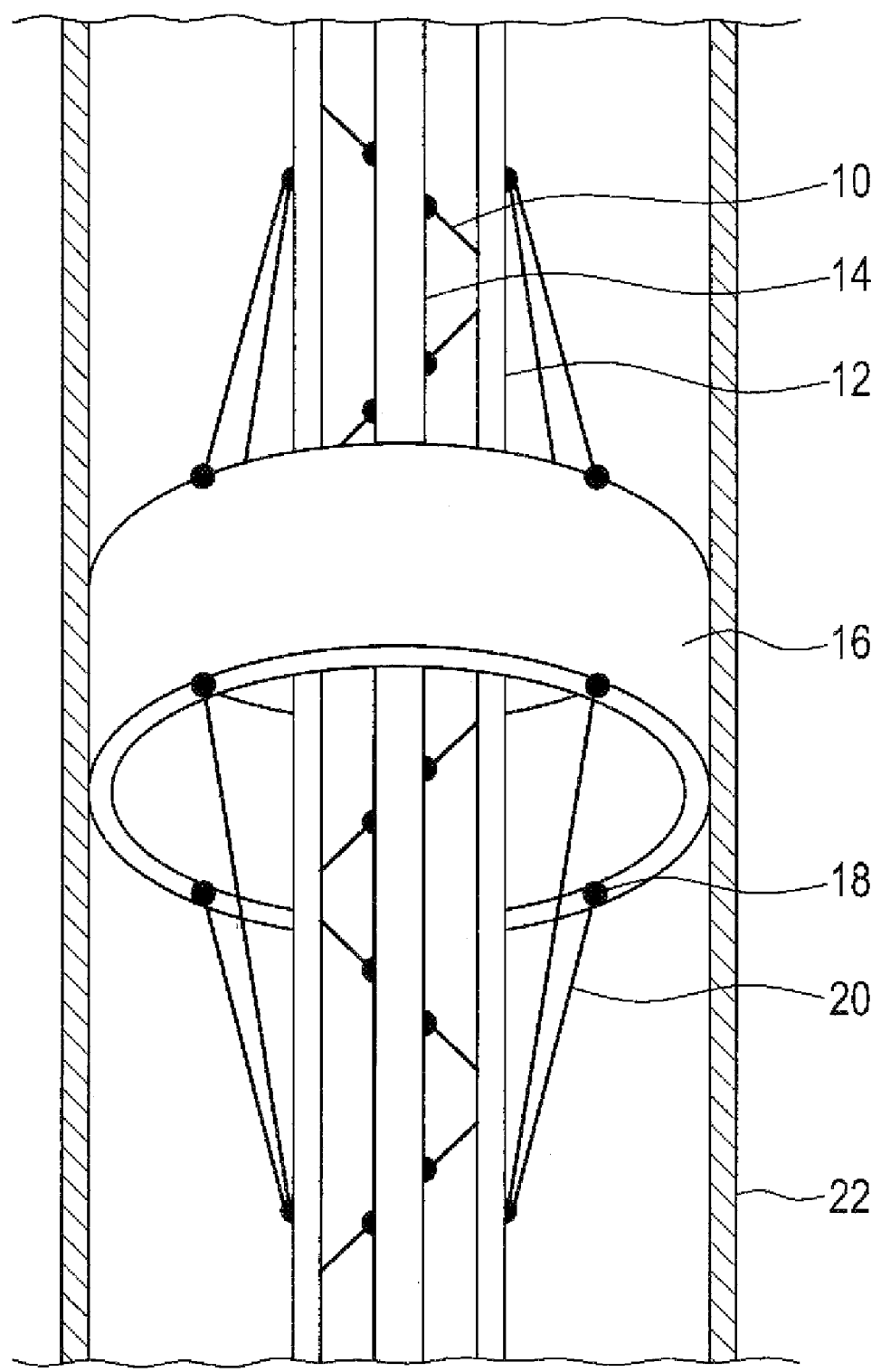
FIG. 1 is a perspective view of the receiver coil showing details of the double-suspension system set-up.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention consists of a receiver coil double-suspension system directed towards maximizing the signal-to-noise ratio (SNR) by reducing microphonic noise. The most troublesome noise may occur in the low frequency portion of the spectrum, and as such the present invention is intended to reduce noise in the low frequency range. The present invention may offer a mechanical isolation system achieving a low cut-off frequency.

The double-suspension receiver coil system of the present invention may enhance the performance of the single-suspension receiver coil system and may minimize the microphonic noises. The double-suspension system may reduce the noise at low frequencies and improve the receiver coil SNR by reducing the transmission of vibration from the outer frame to the receiver coil. It may further reduce the noise produced by the suspension system itself.

Figure 2:
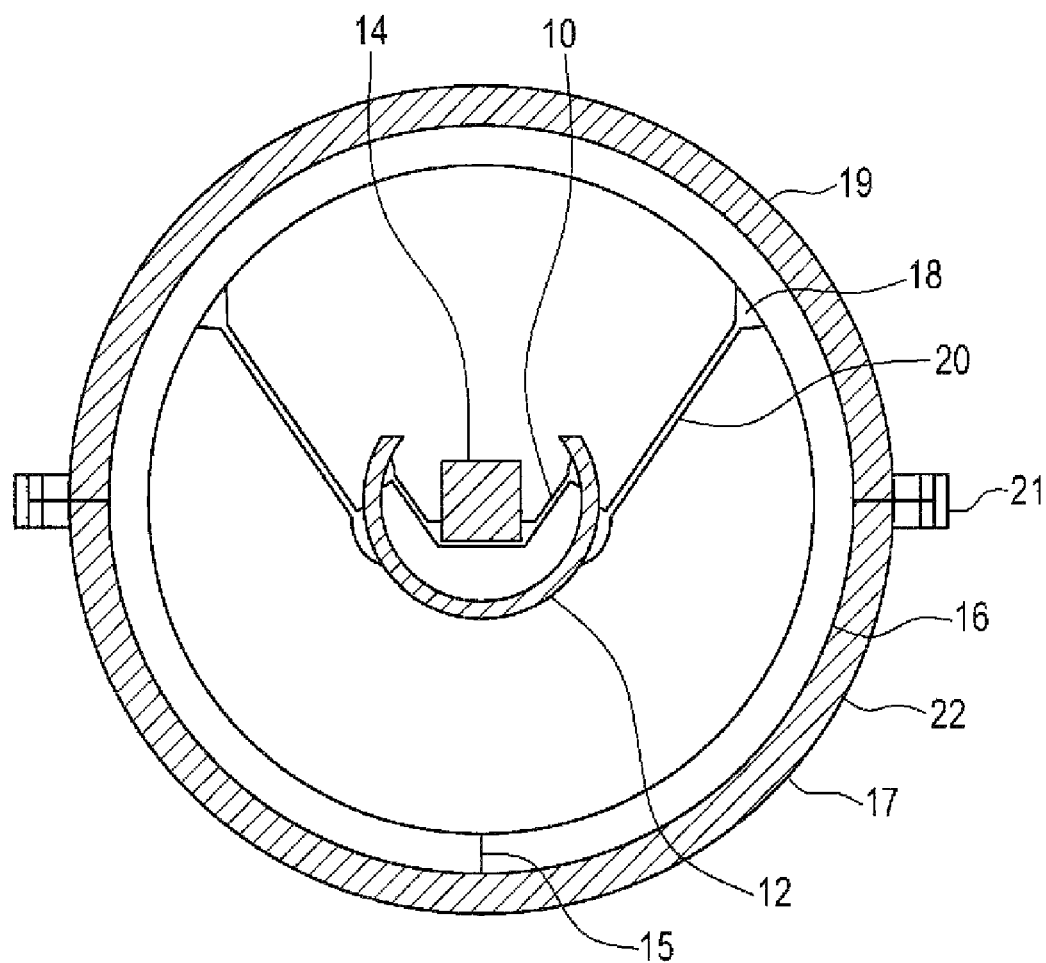
FIG. 2 is a transverse sectional view through supporting ring showing the receiver coil placed at the centre of the inner frame, supported by suspension members and the inner frame placed at the centre of the outer frame supported by the outer elastic bands.

FIG. 1 and FIG. 2 show embodiments of the present invention and in particular the concentric double-suspension system. In these embodiments of the system a set of first suspension members 10, preferably formed of an elastic material, such as rubber, although other materials may also be used, may be used to support the receiver coil 14 at the approximate center of the inner frame 12. A set of second suspension members 20, preferably formed of a rubber material, although other materials may be used, may be used to support the inner frame 12 and cause it to be located at or near the center of the outer frame 22. The first and second suspension members may be mounted at an angle close to the transversal direction to maintain the inner frame and the receiver coil in a position concentric to the structure. This arrangement may prevent the receiver coil and the internal frame from moving away from the centered position, as well as from moving along the transversal direction. Mounting at an angle close to the transversal direction may further provide lateral and vertical support which is required for both the inner and outer frame sets. The positioning may cause a damping of vibration vertically and horizontally.

In one embodiment of the invention, as shown in FIG. 1, the first suspension members may be connected to the receiver coil 14 and the inside wall of the inner frame 12 by cable ties 18. Whereas the second suspension members may be connected to outside wall of the inner frame 12 and either the inside wall of the outer frame, or the inner rings 16 by cable ties 18. Both ends of a suspension member may be connected to a cable tie. This double-suspension system may have the effect of reducing noise at the receiver coil which would otherwise arise from the outer frame 22 as well as noise produced by the rubbing of the suspension. Embodiments of the double-suspension configuration can be effective in lowering the low-pass cut-off frequency of the system, thus lowering the microphonic noise at the receiver coil. In a preferred embodiment the cable ties may be covered with silicone or a similar material to prevent the coil and the inner frame from rubbing against their suspension and thus eliminating the noise produced by rubbing.

In one embodiment of the invention the second suspension members may be mounted on the inner rings close to the transverse position, but may also have a vertical component thereto. The second suspension members may have one end attached radially onto the inner rings, while the other end may be laterally displaced and attached to the inner frame. This structure may be affected for both sides of the inner ring to keep the inner frame in place.

In yet another embodiment of the invention it is possible to use both transverse and vertical suspension to accomplish the same result for each of the first and second suspension members.

In one embodiment of the invention the inner ring may have pre-drilled holes. The cable ties can be fit through the holes and through loops in the first and second suspension members and then may be tied together. Silicone can be applied on the attachment points to prevent any squeaking noise caused by rubbing of the parts. As is evident to a skilled reader, any number of other possible methods can be used to attach the first and second suspension members including: hooks, or a machined hook-like attachment point connected to the attachment points whereby the suspension members may be looped around the hooks and then covered by silicone. Alternatively, loops on the first and second suspension members can be screwed into the attachment points, in a manner similar to the attachment of plugs and sockets of electrical fixtures. Another possibility is to glue the first and second suspension members to the inner frame, and to the outer frame or inner rings. In all possible means of attaching the first and second suspension members to the inner frame or to the outer frame or inner rings, the attachment should be firm and may be coated with silicone, or any equivalent substance to reduce squeaking.

FIG. 2 shows an embodiment of the present invention whereby the receiver coil may be placed at the approximate center of the inner frame 12, and be supported in this position by first suspension members 10 attached to the inside wall of the inner frame 12. The inner frame 12, positioned at the center of the outer frame 22, may be supported in this location by second suspension members 20 attached to the inner rings 16. The inner rings 16 may have cuts 15 therein, preferably positioned at the bottom, to allow for assembly. In one embodiment of the invention, the supporting ring 16 may not be a full circle, to facilitate assembly of the receiver coil double-suspension system.

As shown in FIG. 2, in one embodiment of the invention the inner frame 12 may have an open top-end, whereby the receiver coil, 14 is not fully enclosed by the inner frame 12. An open top-end inner frame may facilitate assembly of the receiver coil within the inner frame.

Figure 3:
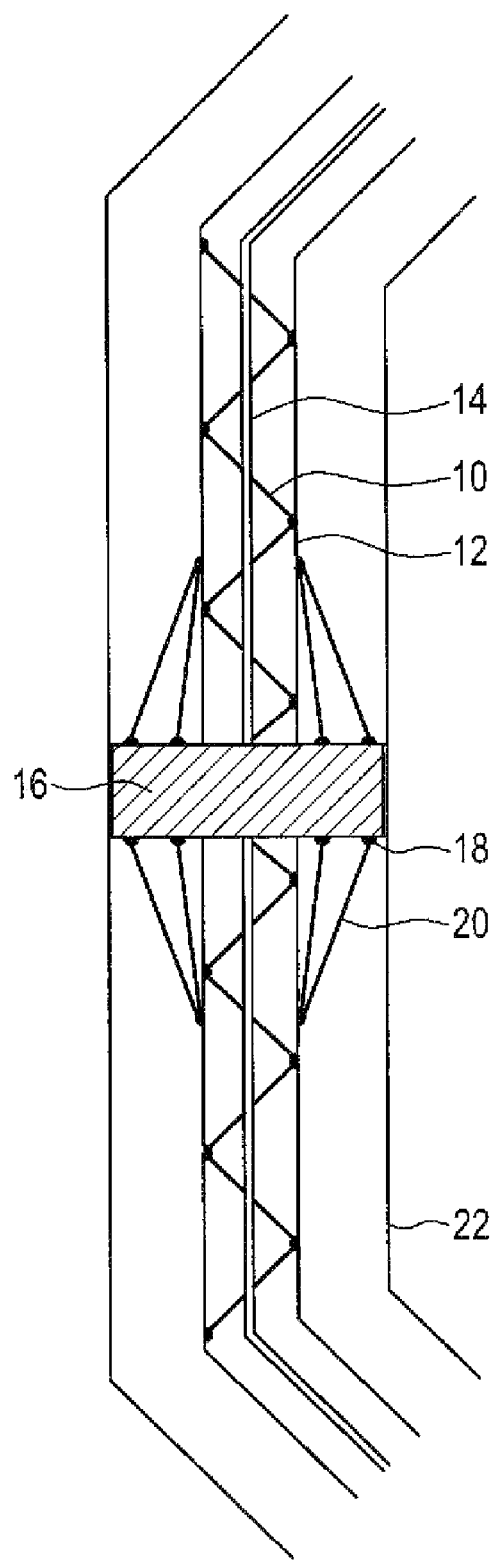
FIG. 3 is a partial sectional top view of an HTEM receiver coil double-suspension system showing the positions of the inner and outer suspension members.
Figure 4:
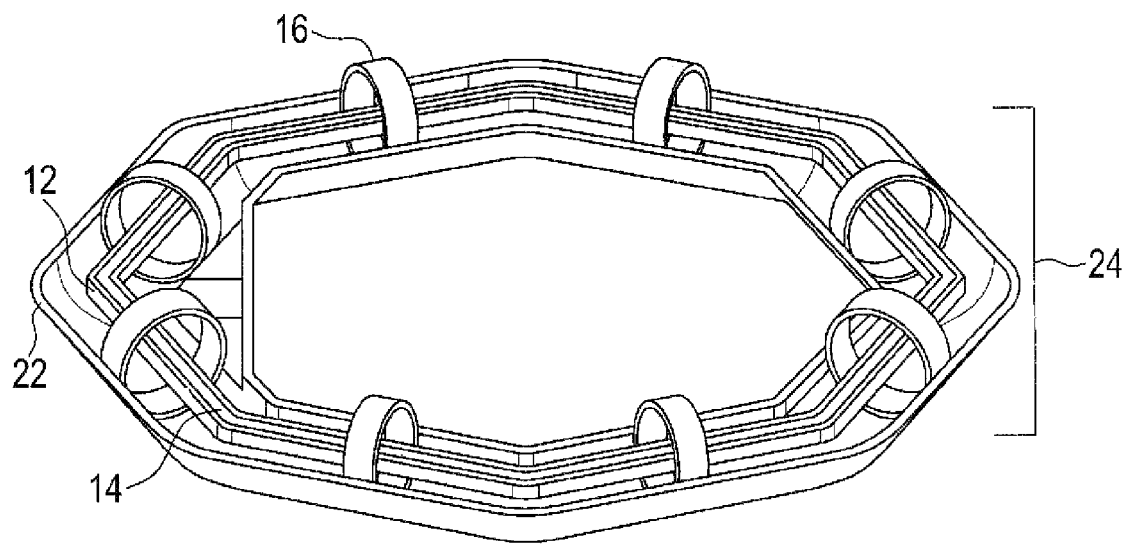
FIG. 4 is a perspective view of an HTEM Receiver Coil double-suspension system showing an octagonal outer-frame having rings fastened to the internal wall thereof (suspension members are not shown to improve clarity).

As shown in FIG. 3 and FIG. 4, in the HTEM receiver coil, the double-suspension system may be mounted inside an outer frame 22 structure constructed of molded fiberglass, although other materials may also be utilized.

In a preferred embodiment the structure may be polygonal, for example octagonal, and have an overall size of approximately 1.2 m. The outer frame 22 may be shaped so as to have an approximately 150 mm circular cross-section and include walls of approximately 6 mm thickness. The inner frame 12 may be shaped to have an approximately 50 mm cross-section and include walls of approximately 3 mm thickness. The receiver coil may be positioned at or close-to the centre of the inner frame by way of a multi-point double-suspension system. The inner frame 12 may be positioned at the center of the outer frame 22 by another multi-point suspension system. The receiver coil and inner frame positioning multi-point suspension systems may be constructed of first and second suspension members 10 and 20 formed from elastic material, such as rubber, secured by way of cable ties 18 that may be silicone-covered.

FIG. 3 shows an embodiment of the present invention that may function as a HTEM Receiver Coil double-suspension system. In this embodiment the second suspension members 20 may keep the inner frame 12 positioned at the center or close to the centre, of the outer frame 22, and the receiver coil 14 may be positioned at the center or near the centre of the inner frame 12 and held in this position by first suspension members 10. The first and second suspension members 10 and 20 may be placed in alternating diagonal positions in order to maintain tension along the transversal direction.

FIG. 4 and FIG. 2 show an embodiment of the present invention wherein the outer frame may be constructed as a two sections 17 and 19. In one embodiment the two-piece section may be shaped as a two-piece shape. The two sections 17 and 19 may be constructed of molded glass fiber, or any other appropriate material. As shown in FIG. 2 the sections may be held together by screws 21. The combination of the inner frame 12 having an open top-end, the sectional structure of the outer frame, and the screw mechanism for releaseably attaching the outer frame sections, may allow for easy access to the receiver coil for the purposes of assembly, mounting, testing, and repair, including repair in the field.

In one embodiment of the invention the suspension members may be replaced and covered by silicone should they break in the field. Inner rings may also be replaced in the field and the outer frame can either have a broken section replaced, or can be mended through the use of materials, such as fiberglass, in the field.

In one embodiment wherein the outer frame is constructed of two sections 17 and 19, the second suspension members 20 may connect to the inner rings 16. This structure allows the two sections 17 and 19 to be separable without affecting the suspension of the receiver coil.

As shown in FIG. 4 an embodiment of the invention may include multiple inner rings 16. In one embodiment of the present invention inner rings 16 may be fastened to the internal wall of the outer frame 22, at approximately the mid-point of each side of the outer frame.

Figure 5:
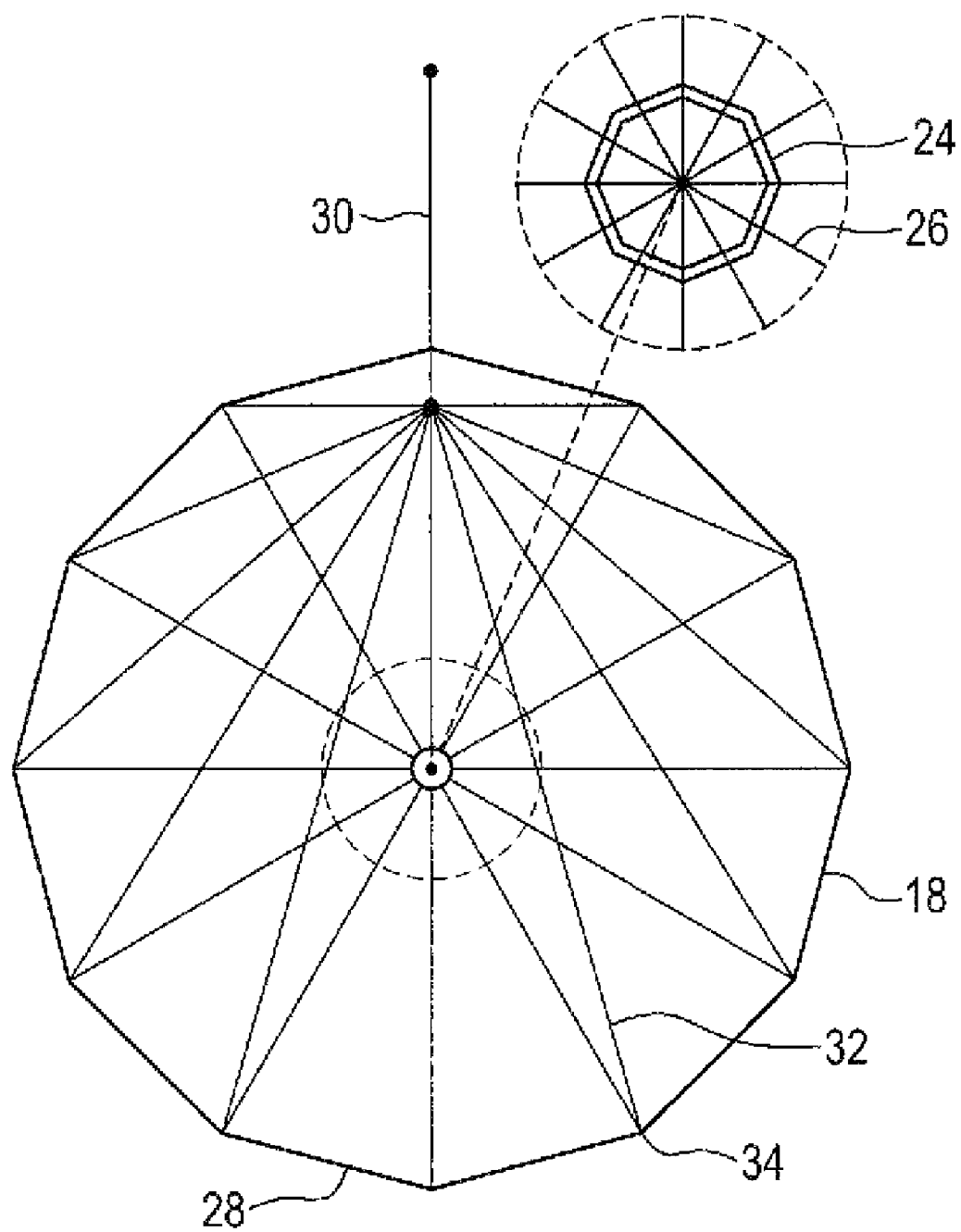
FIG. 5 is a detailed top view of the receiver coil frame and its placement at the centre of the dodecagonal HTEM transmitter coil frame.

FIG. 5 shows an embodiment of the Receiver Coil frame as it may be utilized in conjunction with an HTEM transmitter coil frame. In this embodiment, the HTEM receiver coil frame 24 may be positioned at the centre of the transmitter coil frame 28.

In one embodiment of the invention the transmitter coil frame may be a dodecagonal shape and approximately 26 m in diameter. In one embodiment of the invention the receiver coil frame 24 and the transmitter coil frame 28 may be connected by a system of radial cables 26. Each of the receiver coil frame 24 and transmitter coil frame 28 may be held in place by an external mesh suspension system 32 attached to the corners 34 of the receiver coil frame 24 and transmitter coil frame 28. Both coil suspensions systems may be attached to a cable 30 which may be towed by an aircraft, such as a helicopter.

Figure 6:
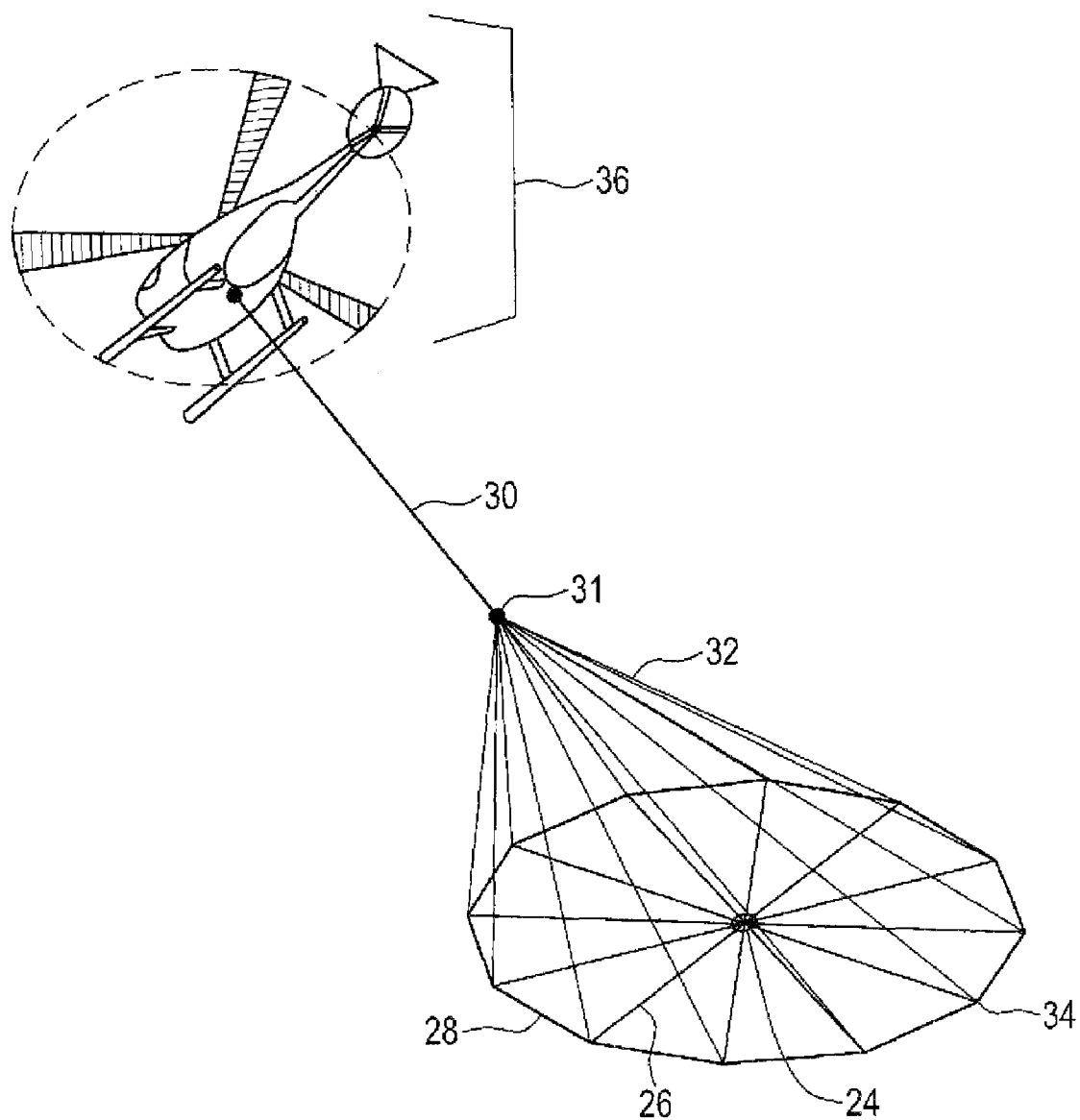
FIG. 6 is an illustration of an embodiment of the present invention as used in a HTEM system towed by a helicopter.

FIG. 6 shows an embodiment of the present invention that may be preferable for use as an HTEM receiver coil frame 24 in conjunction with a transmitter coil 28 wherein the combination of coils may be in flight being towed by a helicopter 36 flying at a speed capable of suspending the coils in a near-horizontal position.

In one embodiment of the present invention, the HTEM transmitter 28 and receiver coil frames 24 may be in flight progress at an appropriate surveying speed, for example an approximate speed of 30 m/s, or any other surveying speed that is capable of suspending the coils in a near-horizontal position.

In another embodiment of the invention, the transmitter coil frame 28 maybe supported by the external mesh suspension system 32 from a point away from the centre of the coil, for example approximately 20 m away from the centre of the coil, and this suspension point 31 may be attached to the helicopter 36 by a long cable, for example a cable approximately 21 m long 30. In this embodiment of the invention, the receiver coil frame may be suspended by multiple cables of varying lengths converging at a point distant from the centre of the receiver coil frame and even more distant from the helicopter, for example a point located approximately 1 m away from the center of the receiver coil frame 24, and approximately 40 m away from the helicopter 36.

As shown in FIG. 6, in one embodiment of the invention, while in flight the transmitter and receiver coils may be suspended in a near-horizontal or horizontal position, with the towing cable at an angle from the vertical, for example an angle of approximately 35 degrees from the vertical. The suspension structure may maintain the horizontal positions of the coils during flight due to a combination of the drag produced by the wind, the weight of the structure and the two suspension meshes.

Figure 7:
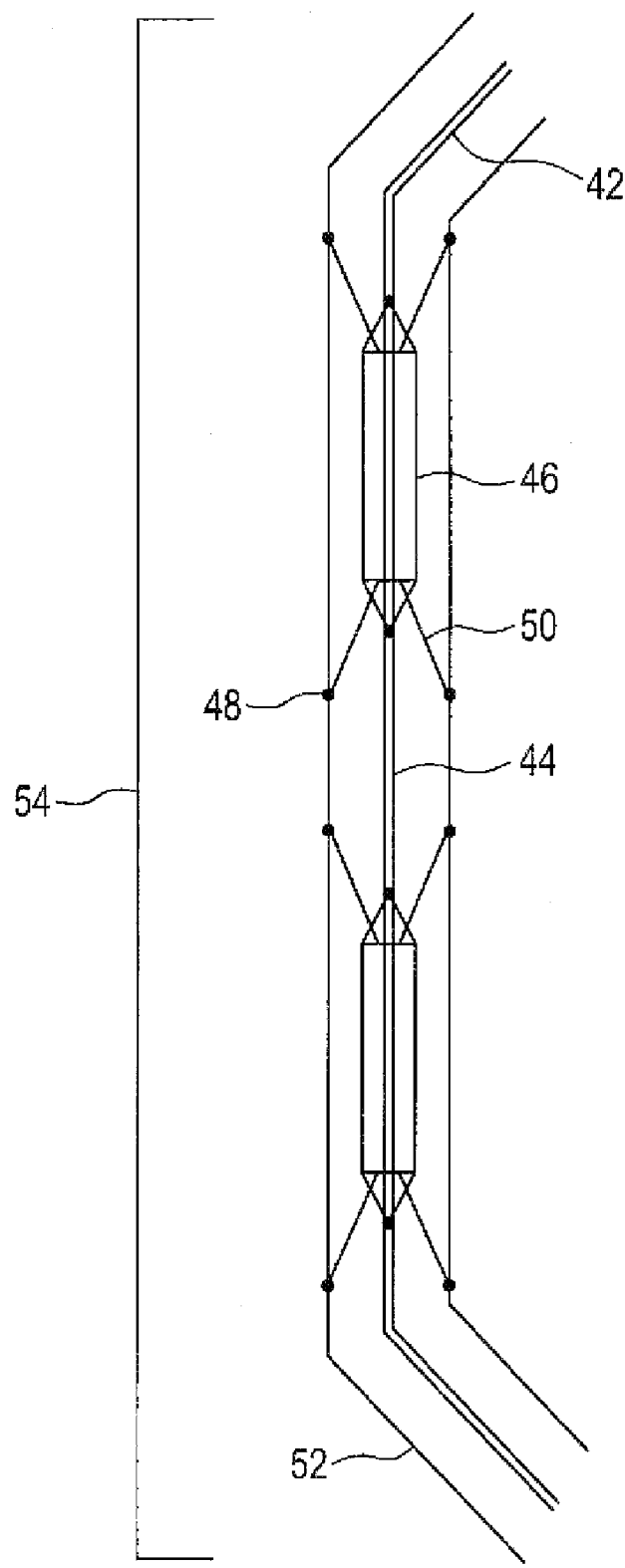
FIG. 7 is a partial top view of an AFMAG receiver coil double-suspension system showing the position of the suspension members.

FIG. 7 shows another embodiment of the present invention that may be preferable for application as an AFMAG Receiver Coil double-suspension system, as an AFMAG system does not have a transmitter coil. In this embodiment of the present invention the AFMAG receiver coil frame 54 may be an octagon formed of non-conductive material having an overall size of approximately 8 m. In this embodiment there may be no inner rings, the inner frame may be non-continuous, and the inner frame may be composed of sections along each side of the octagon to a total of 16 sections.

In one embodiment the receiver coil frame 54 may be separated into pieces for ease of transportation. In another embodiment the receiver coil frame 54 may be separated into a number of pieces equal to the number of sides of the frame, such as eight pieces for an octagonal-shaped frame.

In another embodiment the outer frame 52 is shaped to a circular cross-section, for example an approximate 300 mm circular cross-section, that has walls, for example of an approximately 5 mm thickness. In a further embodiment the segmented inner frame 46 may be shaped to be smaller than the outer frame, for example to have an approximate 150 mm cross-section and to have walls of an approximate 5 mm thickness.

In yet a further embodiment, the receiver coil 42 may be held at the centre of the open-top inner frame 46, using a multi-point double-suspension system, and the inner frame 46 may be held at the center of the outer frame 52 by another multi-point suspension system 50.

In one embodiment the double-suspension system and multi-point suspension system 50, may be comprised of first and second suspension members and cable ties 48, the first and second suspension members being positioned to diagonally alternate to maintain tension along the transversal direction.

Figure 8:
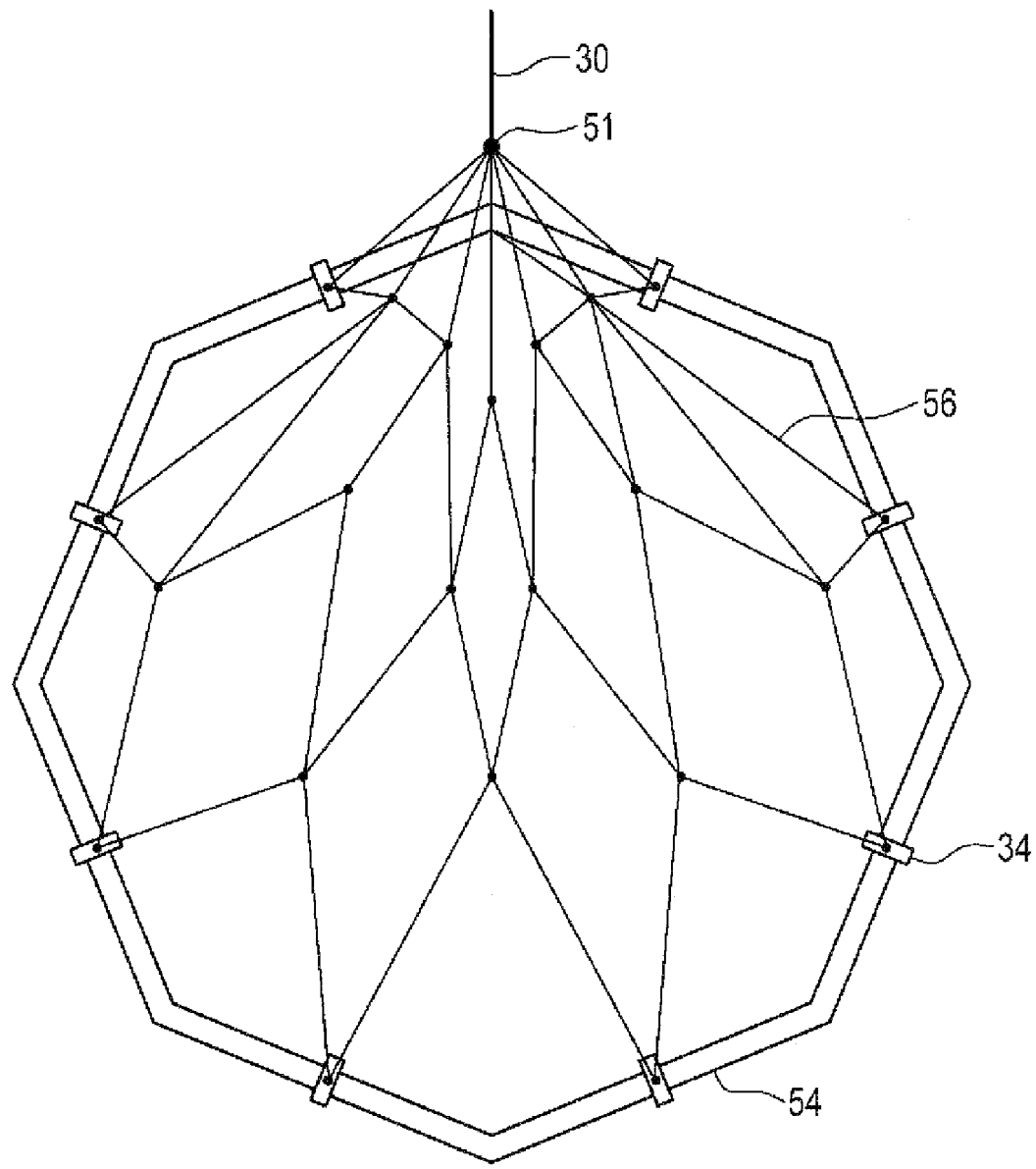
FIG. 8 is a top view of the AFMAG Receiver Coil frame showing the suspension mesh.

FIG. 8 shows an embodiment of the present invention that may be preferable for application as an AFMAG receiver coil. In this embodiment the receiver coil frame 54 may be supported by a suspension mesh 56. In one embodiment of the invention the receiver coil frame 54 may have an overall size that may measure, for example approximately 8.0 m. The receiver coil frame 54 may be suspended by cables of varying lengths to a point 51 of connection to a tow rope 30 located, for example approximately 9 m away from the center of the receiver coil frame 54.

Figure 9:
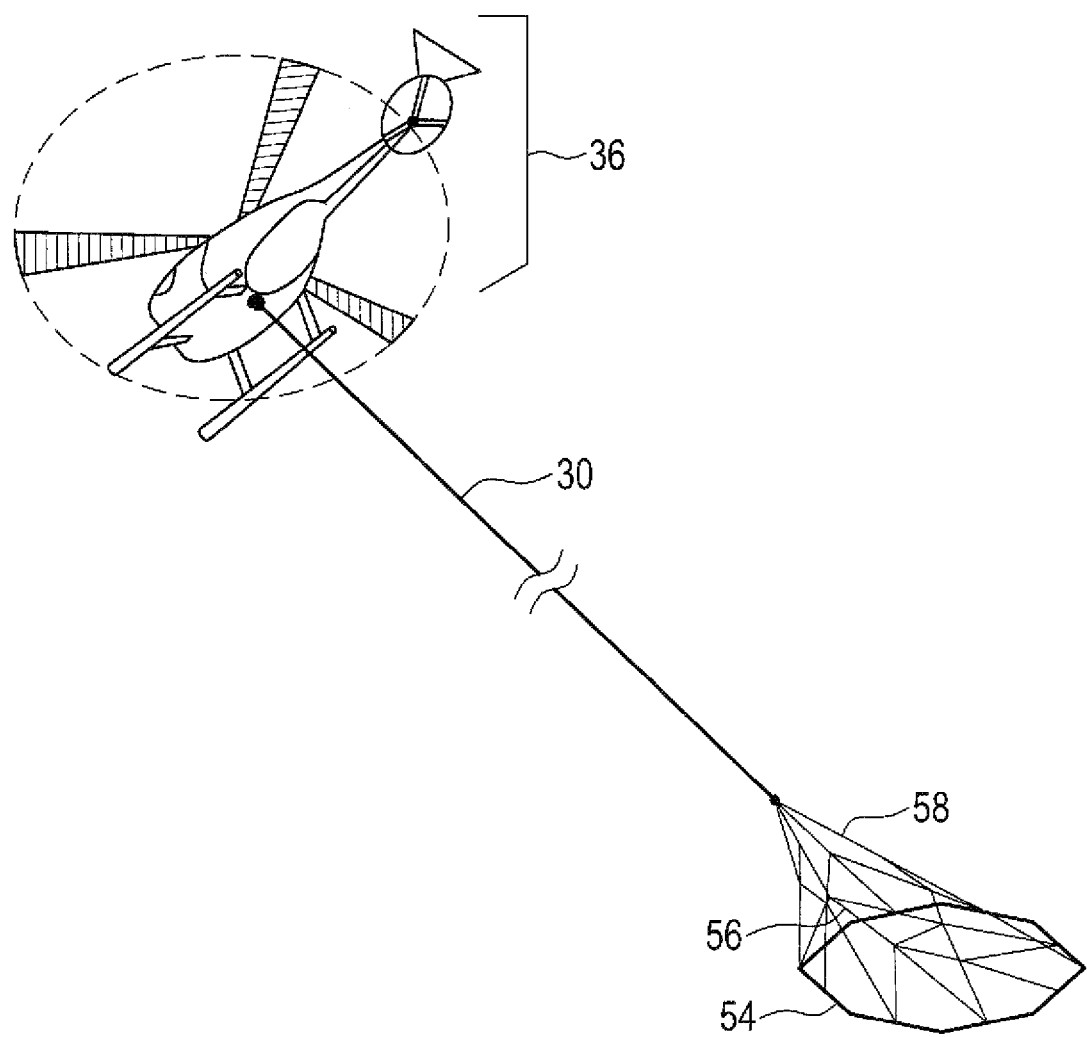
FIG. 9 is an illustration of an embodiment of the present invention as used in an AFMAG system towed by a helicopter.

FIG. 9 shows an embodiment of the present invention that may be preferable for application as an AFMAG receiver coil frame wherein the receiver coil is in flight towed by a helicopter 36 that may be flying at a constant speed to maintain the coil in a horizontal or near horizontal position. In this embodiment the receiver coil frame 54 may be supported by the suspension mesh 56 from a point that is approximately 9 m away from the centre of the receiver coil frame 54, this suspension point further being suspended from the helicopter 36 by a cable 30 that may measure, for example approximately 90 m long.

In this embodiment the length of each suspension cable 58 may vary such that during flight the receiver coil frame 54 is maintained in a horizontal position or near-horizontal position. The towing cable 30 may be at an angle from the vertical during flight, for example approximately 35 degrees from the vertical, to support the near-horizontal positioning of the receiver coil frame 54. The receiver coil system may maintain the horizontal or near-horizontal position during flight due to a combination of the drag produced by the wind, the weight of the structure and the meshes.

Figure 10:
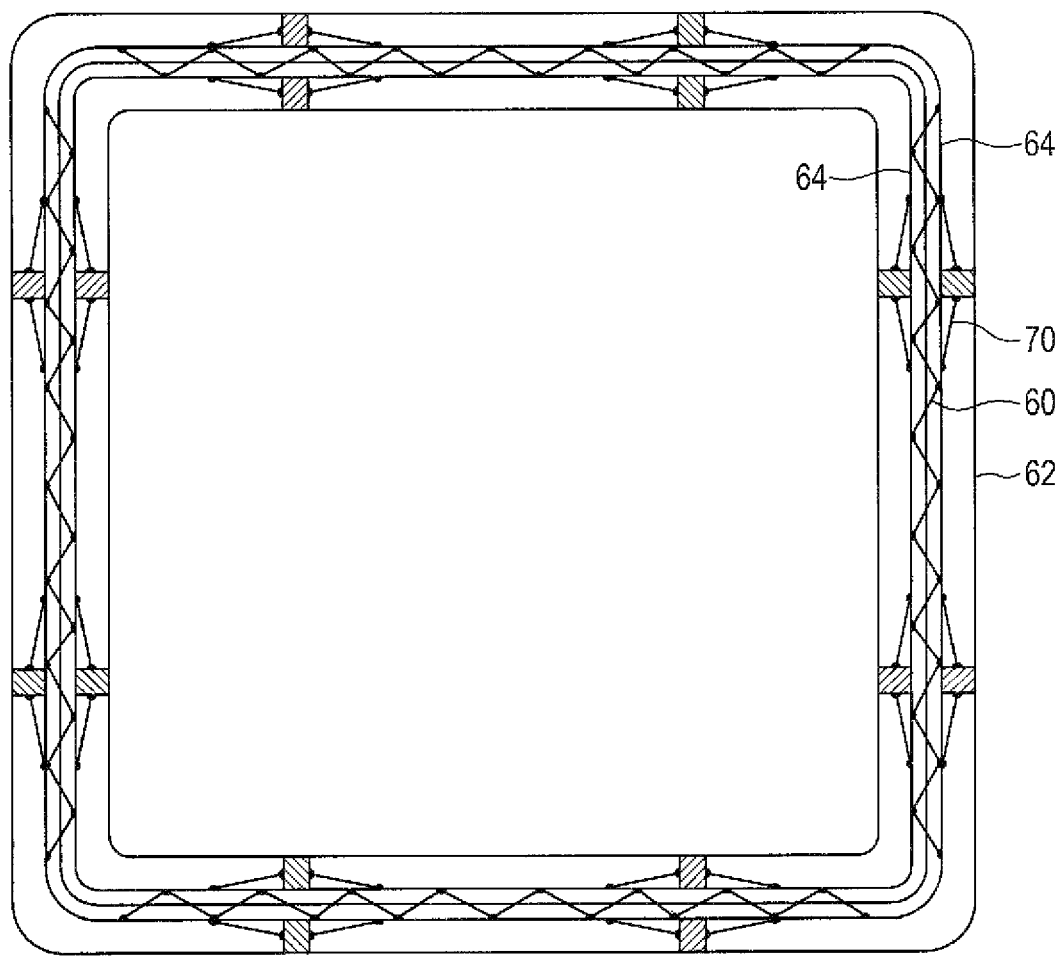
FIG. 10 is a side view of an AFMAG ground-based square receiver coil.

FIG. 10 shows an embodiment of the present invention that may be preferable for application as a double-suspension AFMAG ground-station receiver coil. Ground-station coils may typically be mounted in pairs in a vertical position, with the two coils orthogonal to each other, in such way that is possible to measure the magnetic field vector in the horizontal plane. Whenever a third coil is necessary to measure the vertical component of the magnetic field, it may be placed on the ground.

As FIG. 10 shows, in yet another embodiment of the present invention as a ground-station receiver coil 62, two coils may be mounted vertically perpendicular to each other to measure the magnetic field in the horizontal plane. In this embodiment, each receiver coil may be supported by a double-suspension system with suspension members 60 and 70 that may be constructed of an elastic material, such as rubber, or any other material having requisite tensile strength to accommodate the weight of the receiver coils and the inner frame 64.

It will be appreciated by those skilled in the art that other variations of the embodiments described herein may also be practiced without departing from the scope of the invention. Other modifications are therefore possible.

We claim:

1. A double-suspension receiver coil apparatus comprising:
   (a) a receiver coil;
   (b) one or more first suspension members;
   (c) one or more second suspension members;
   (d) an inner frame;
   (e) an outer frame; and
   (f) one or more inner rings located within the outer frame;
   wherein the receiver coil is suspended by the first suspension members that connect the receiver coil and the inner frame so as to be positioned at or near the centre of the inner frame and the inner frame is suspended by second suspension members that connect the inner frame and the one or more inner rings so as to be positioned at or near the centre of the outer frame, the inner frame being suspended at or near the centre of the one or more inner rings, wherein the one or more inner rings is a circular form having a cut in an edge thereof, whereby the ring may be manipulated into an open position for the purpose of affixing the inner frame therein.

2. A double-suspension receiver coil apparatus as in claim 1 wherein the first suspension members and second suspension members are positioned close to the transversal direction to suspend the receiver coil at or near the centre of the inner frame and to suspend the inner frame at or near the centre of the outer frame.

3. A double-suspension receiver coil apparatus as in claim 2 wherein the first suspension members and second suspension members are formed of rubber.

4. A double-suspension receiver coil apparatus as in claim 1 wherein the cut in the one or more inner rings is in a bottom edge thereof.

5. A double-suspension receiver coil apparatus as in claim 1 wherein the first suspension members that suspend the receiver coil connect to the receiver coil and inner frame by one or more cable ties; and the second suspension members that suspend the inner frame connect to the inner frame and the outer frame by one or more cable ties.

6. A double-suspension receiver coil apparatus as in claim 5 wherein the one or more cable ties is formed of plastic and coated with silicone.

7. A double-suspension receiver coil apparatus as in claim 1 wherein the first suspension members that suspend the receiver coil connect to the receiver coil and inner frame by one or more cable ties; and the second suspension members that suspend the inner frame connect to said one or more inner rings by one or more cable ties.

8. A double-suspension receiver coil apparatus as in claim 1 wherein the outer frame is circular shaped comprised of a first and second section and the first and second sections being releaseably attached whereby the first and second sections may be separated causing an opening there-between for the purpose of insertion the inner frame.

9. A double-suspension receiver coil apparatus as in claim 1 wherein the inner frame is semi-circular shaped having an open top end whereby the receiver coil may be inserted therein.

10. A double-suspension receiver coil apparatus as in claim 1 wherein the first suspension members and second suspension members are elasticized material.

11. A double-suspension receiver coil airborne system comprising:
  (a) a tow assembly for connection to an aircraft, the tow assembly including:
    (i) a transmitter section;
      (A) a transmitter frame; and
      (B) a receiver frame including:
        (I) an inner frame having a receiver coil therein suspended by one or more first suspension members so as to be positioned at or near the centre of the inner frame; and
        (II) an outer frame and a plurality of spaced apart inner rings positioned within the outer frame, the inner frame suspended by one or more second suspension members from each of the inner rings so as to be positioned at or near the centre of the outer frame, the inner rings each having a cut in an edge thereof, whereby the ring may be manipulated into an open position for the purpose of affixing the inner frame therein.

12. A double-suspension receiver coil airborne system as in claim 11, wherein the one or more first suspension members and one or more second suspension members are formed of an elastic material and being connected between the inner and outer frames or the inner frame and the receiver coil by way of one or more silicone cable ties, whereby rubbing of the suspension members, receiver coil, outer frame, and inner frame elements is minimal.

13. A double-suspension receiver coil airborne system as in claim 11, wherein the inner frame and outer frame each comprise a plurality of inter-connectable section frame members, the inner frame sections having an open top end, and the outer frame sections being formed of top and bottom releaseably attachable sections such that the receiver frame can be assembled and disassembled.

14. A double-suspension receiver coil airborne system as in claim 13, wherein the inner frame and outer frame each define a polygonal profile.

15. A double-suspension receiver coil airborne system as in claim 11, wherein the receiver frame is connected to the transmitter frame by means of a plurality of connecting cables.

16. A double-suspension receiver coil airborne system as in claim 11, wherein the tow assembly is connected to the aircraft by means of at least one cable means connected to the transmitter section at a plurality of points.

17. A double-suspension receiver coil airborne system as in claim 16, wherein the tow assembly is connected to the aircraft by means of a central cable at a first end connected to the aircraft, the central cable also including a second end opposite to the first end, and wherein a plurality of connecting cables are connected between the second end of the central cable and a plurality of points generally evenly distributed along the circumference of the transmitter section.

18. A double-suspension receiver coil airborne system as in claim 17, wherein the cables connected to the transmitter section are of varying lengths to permit the suspension of the transmitter section in a substantially horizontal position when submitted to aerodynamic forces during flight.

19. A double-suspension receiver coil airborne system as in claim 11, wherein the aircraft is a helicopter.

20. A method of assembling a double-suspension receiver coil system comprising the steps of:
  (a) suspending a receiver coil within an inner frame with an_inner frame suspension means including:
    (i) one or more first suspension members wherein the first suspension members connect to the inner frame and the receiver coil and whereby said connection the receiver coil is suspended close to the centre of the inner frame;
  (b) suspending the inner frame within an outer frame with an_outer frame suspension means including:
    (i) one or more inner rings; and
    (ii) one or more second suspension members;
  wherein the inner rings are secured to the inside wall of the outer frame and the second suspension members connect to the inner rings and the inner frame and whereby said connection the inner frame is suspended close to the centre of the outer frame and wherein the one or more inner rings each include a cut there through and the one or more inner rings are opened along the cut to permit the inner frame to be positioned therein.

21. A method of assembling a double-suspension receiver coil system as in claim 20 comprising the further step of connecting the double-suspension receiver coil system to a tow assembly including:
  (a) a central cable for connection to an aircraft having a first end connected to the aircraft, the central cable also including a second end opposite to the first end; and
  (b) a plurality of connecting cables;
  wherein the plurality of connecting cables are connected between the second end of the central cable and a plurality of points generally evenly distributed along the circumference of the double-suspension receiver coil system.

22. A method of assembling a double-suspension receiver coil system as in claim 20 comprising the further step of coating the first and second suspension member connections with silicone.

23. A method of assembling a double-suspension receiver coil system as in claim 20 comprising the further step of connecting the first and second suspension members by way of one or more cable ties.

24. A method of assembling a double-suspension receiver coil system as in claim 20 further comprising the steps of:
   (a) combining a first and second section of the outer frame to create an outer frame that encloses the inner frame and first and second suspension members; and
   (b) securing the first and second sections of the outer frame in a releaseably attached manner.

25. A method of assembling a double-suspension receiver coil system as in claim 20 comprising the further step of inserting the receiver coil for suspension into an inner frame having an open top-end.

26. A double-suspension receiver coil airborne system comprising:
   (a) a tow assembly for connection to an aircraft, the tow assembly including:
   (i) a receiver frame including:
      (A) an inner frame having a receiver coil therein suspended by one or more first suspension members so as to be positioned at or near the centre of the inner frame; and
      (B) an outer frame having the inner frame suspended by one or more second suspension members so as to be positioned at or near the centre of the outer frame,
      the outer frame including releaseably connected top and bottom frame sections separatable from each other to expose substantially the entire suspended inner frame.

27. A double-suspension receiver coil airborne system as in claim 26, wherein a high signal-to-noise ratio is achieved by the structure of the double-suspension receiver coil having one or more first suspension members and one or more second suspension members formed of rubber and being connected between the inner and outer frames or the inner frame and the receiver coil by way of one or more silicone cable ties, whereby rubbing of the suspension members, receiver coil, outer frame, and inner frame elements is minimal.

28. A double-suspension receiver coil airborne system as in claim 26, wherein the inner frame has an open top end allowing access to substantially the entire suspended inner frame.

29. A double-suspension receiver coil airborne system as in claim 26, wherein the tow assembly is connected to the aircraft by means of at least one cable means connected to the receiver frame at a plurality of points.

30. A double-suspension receiver coil airborne system as in claim 26 wherein the first suspension members that suspend the receiver coil connect to the receiver coil and inner frame directly or indirectly; and
   a plurality of inner supporting rings are located within the outer frame, and the second suspension members that suspend the inner frame connect to said supporting rings, said supporting rings each having a cut in an edge thereof, whereby the rings may each be manipulated into an open position for the purpose of affixing the inner frame therein.

31. A receiver coil apparatus for an electromagnetic survey system, comprising:
   a hollow outer frame defining an internal passage;
   an inner frame member;
   a receiver coil;
   a plurality of first elastic suspension members suspending the receiver coil from the inner frame member within the internal passage; and
   a plurality of second elastic suspension members suspending the inner frame member within the internal passage,
   the outer frame being formed from a top section and a bottom section that are releasably secured together such that the top section can be separated from the bottom section to permit access to the internal passage while the receiver coil is suspended therein.

32. The apparatus of claim 31 wherein the outer frame forms a substantially horizontally oriented loop around a central open space that the internal passage and the receiver coil encircle, the top section forming an upper portion of the loop and the bottom section forming a lower portion of the loop.

33. The apparatus of claim 31 wherein the top section can be separated from the bottom section in a direction that is substantially parallel with an axis of the receiver coil.

34. The apparatus of claim 31 comprising an inner ring secured in the internal passage and through which the inner frame member passes, the second suspension members suspending the inner frame member from the inner ring, wherein the inner ring engages an inner wall of the outer frame and the inner ring includes a cut through a portion thereof to allow a portion of the receiver coil and the inner frame member to pass therethrough.

35. The apparatus of claim 31 wherein the inner frame member defines a continuous coil channel in which the first elastic members suspend the receiver coil.

36. The apparatus of claim 35 wherein the inner frame member has an open top side permitting access to the receiver coil while the receiver coil is suspended in the coil channel.

37. The apparatus of claim 31 wherein the inner frame member is a tubular section that defines an internal tubular passage through which the receiver coil passes.

38. The apparatus of claim 37, comprising a plurality of the tubular sections spaced along the internal passage, each tubular section having a respective set of first suspension members suspending a respective portion of the receiver coil and a respective set of second suspension members suspending the tubular section from the tubular outer frame.

39. The apparatus of claim 31 wherein at least some of the first suspension members are connected at non-right angles to the receiver coil in opposing tension to each other to dampen both radial and axial movement of the receiver coil within the internal passage, and wherein at least some of the second suspension members are connected at non-right angles to the inner frame member and in opposing tension to each other to dampen both radial and axial movement of the inner frame member within the internal passage.

40. The apparatus of claims 31 wherein the outer frame forms a polygonal or circular loop.

* * * * *